United States Patent [19]
Besant

[11] 3,816,742

[45] June 11, 1974

[54] NEUTRON SPECTRUM STANDARD

[75] Inventor: Colin Bowden Besant, Marlow, England

[73] Assignee: United Kingdom Atomic Energy Authority, London, England

[22] Filed: Aug. 4, 1972

[21] Appl. No.: 277,975

[30] Foreign Application Priority Data
Aug. 6, 1971   Great Britain.................... 37185/71

[52] U.S. Cl. ............................................... 250/499
[51] Int. Cl................................................. G21g 3/04
[58] Field of Search................ 250/84.5, 106.5, 499

[56] References Cited
UNITED STATES PATENTS
| | | | |
|---|---|---|---|
| 3,073,768 | 1/1963 | Richmond et al. | 250/84.5 X |
| 3,628,020 | 12/1971 | Briand | 250/84.5 |

*Primary Examiner*—James W. Lawrence
*Assistant Examiner*—Davis L. Willis
*Attorney, Agent, or Firm*—Larson, Taylor & Hinds

[57] ABSTRACT

In order to carry out experiments and to make measurements of a fast neutron flux it is desirable to have an enclosure, accessible from outside, in which a fast neutron flux of fairly consistent spectrum can be produced, using any convenient irradiation source. The invention provides this apparatus which comprises concentric inner and outer hollow spheres of, respectively, natural uranium and of boron carbide, so that on irradiation in a thermal flux, fast neutrons emanating from the UNAT appear within the inner sphere to the exclusion of thermal neutrons, which are absorbed by the boron carbide sphere. The interior of the latter forms an enclosure in which experiments can be introduced and mounted conveniently on a composite closure plug, which protrudes into the enclosure.

9 Claims, 4 Drawing Figures

3,816,742

NEUTRON SPECTRUM STANDARD

BACKGROUND OF THE INVENTION

This invention relates to apparatus for providing a standard neutron spectrum. For the performance of nuclear physics experiments, especially in the field of fast reactor physics it is desirable to have available a standard neutron flux whose spectrum is known or can be reliably measured. Zero energy fast critical lattices have been used for providing a neutron standard. Such assemblies are very costly and are not suitable as a standard test assembly which could be widely used for the development of reliable and accurate fast reactor flux measuring techniques.

SUMMARY OF THE INVENTION

The invention resides in apparatus for irradiation in a neutron flux having a wide thermal energy spectrum said apparatus being adapted in consequence of such irradiation to provide within an enclosure a well defined neutron spectrum having a dominant above - thermal component, the apparatus comprising means defining said enclosure for the reception of fast neutron - responsive devices said means being surrounded by a wall of neutron reactive material which undergoes reactions with thermal neutrons to produce fast neutrons and also by a layer of thermal neutron absorber material between the enclosure and the neutron reactive material. The apparatus may include a member of moderating material having a cavity therein and means within the cavity for supporting a hollow sphere of natural uranium with a spherical shell of thermal neutron absorber material within the hollow sphere. Coincident access ports in the sphere and the shell are preferably provided which are closed by a removable elongated plug assembly adapted to close the access ports with plugs of appropriate material, the plug assembly also serving to support within the enclosure fast neutron responsive devices. Both the sphere and the shell are preferably mounted concentrically within a spherical cavity in a block of neutron moderating material having an access port therein coincident with access ports in the sphere, and the shell.

DESCRIPTION OF THE DRAWINGS

One example of an apparatus embodying the invention will now be described in the form of an apparatus affording a fast neutron spectrum standard for fast neutron experiments. In the description reference will be made to the accompanying drawings in which.

DESCRIPTION OF THE PREFERRED EMBODIMENT

Figure 1:
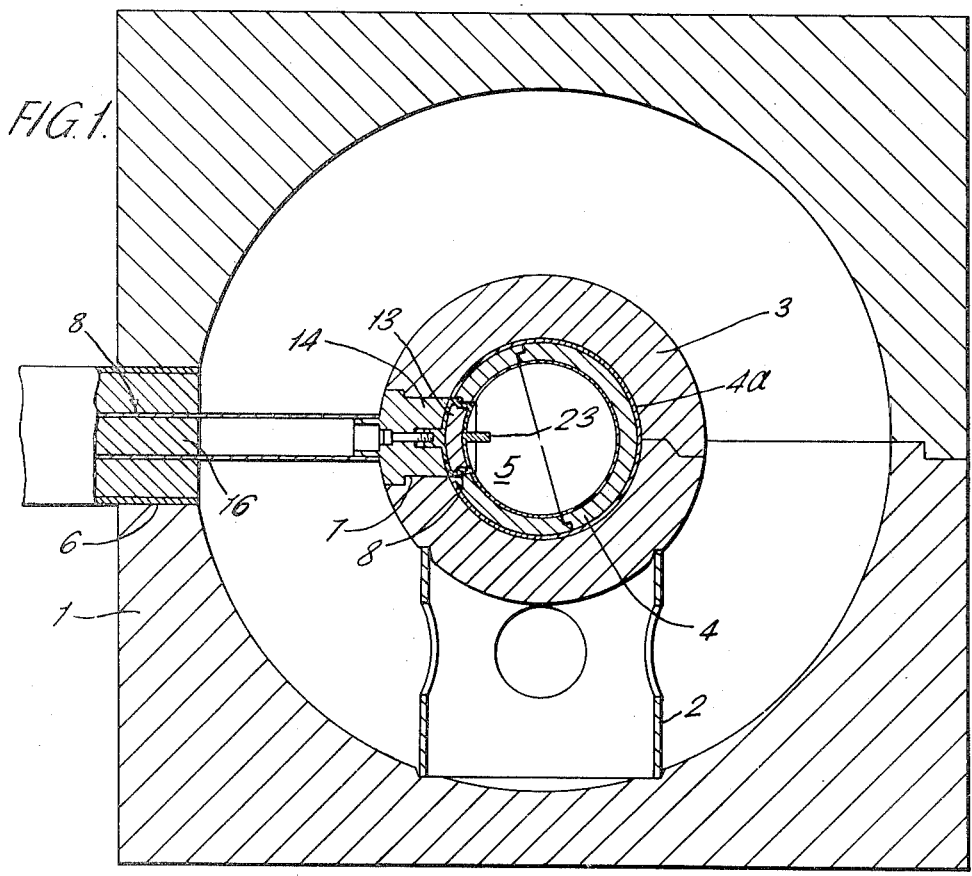
FIG. 1 shows the apparatus in side elevation in cross section.

In the drawing the assembly shown is intended for irradiation in a neutron flux where the neutron energy spectrum is mainly thermal ie it has a Maxwellian distribution, the apparatus being adapted in such a flux to provide, within an enclosed volume, a neutron spectrum having a dominant fast component. To this end, the assembly, which defines the enclosure, is supported within a spherical cavity in a hollow graphite cube 1, on an aluminium cylinder 2. The assembly itself is spherical and the length of the cylinder 2 is such that its centroid substantially coincides with the centroid of the spherical cavity in the graphite. The outer-most part of the assembly is a hollow sphere of natural uranium 3 suitably grooved to sit neatly on the upper end of cylinder 2. The inner face of the sphere 3 is snugly engaged by a further hollow shell 4 of a thermal neutron absorber. Conveniently the latter comprises boron carbide which is of powdered form and is contained by a spherical cannister of aluminium 4a. The interior of the shell 4 defines the enclosure 5.

Access to the enclosure is afforded by a series of coincident ports comprising, a port 6 in the graphite cube, a stepped port 7 in the natural uranium sphere 3 and a stepped port 8 in the shell 4. These ports are closed by the same tool that is used to insert samples, or measuring devices into the enclosure 5. This tool (FIG. 2) comprises a generally tubular member 9 having a holder 12 at one end for holding a sample or neutron flux measuring device. Behind the holder 12, the tool has a boron carbide-steel plug 13 for closing port 8. The plug 13 is backed by a plug 14 of natural uranium for closing port 7. A rearwardly extending spigot 14a on the plug 14 enters one end of an aluminium tube 15 whose end remote from the spigot 14a is occupied by a graphite plug 16 and the end portion enters a bore in graphite rod 17 enclosed in an aluminium sheath 18. A pin 19 secures the tube 15 to the rod 17, which closes the port 6.

Figure 2:
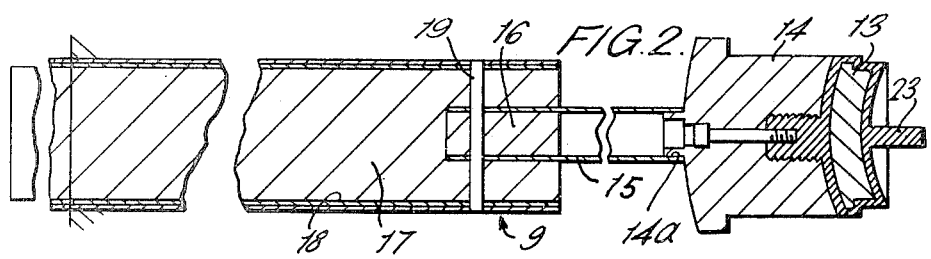
FIG. 2 shows the access plug assembly and foil holder.
Figure 3A:
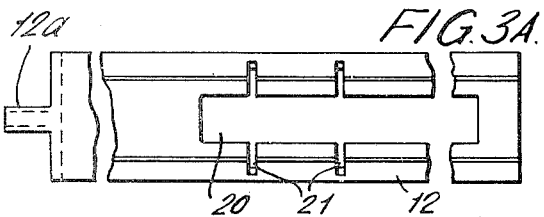
FIG. 3A shows in plan view the foil holder.
Figure 3B:
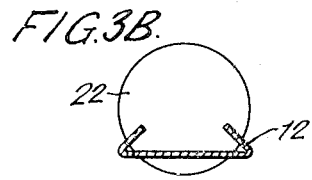
FIG. 3B shows in end elevation the foil holder.

In FIG. 1 the tool described in the previous paragraph is shown in position closing the several ports. FIG. 2 shows in addition the same holder 12 which comprises an aluminium strip of flattened U cross-section having a cut away portion 20. The latter cooperates with a number of slots 21 cut in the limbs of the strip to afford support for discs, such as 22, of aluminium foil, used for measuring neutron distribution, at a number of spaced positions along the length of the holder. The holder 12 has a tubular end portion 12a by which it is attached, cantilever fashion, at one end to a spigot 23 which protrudes from the end wall of the boron carbide steel plug 13.

The rear face of the plug 13 is provided with a screw threaded extension which screws into a tapped hole in the plug 14 of natural uranium.

It will be appreciated from the foregoing that neutrons emanating from a source exterior to the cube 1 and incident upon the exterior thereof will be thermalised and will appear as thermal neutrons within the cavity that surrounds the apparatus defining the enclosure 5 in which experiments have previously been placed. These thermal neutrons whose energies approximate to a Maxwellian distribution enter the natural uranium of the adjacent sphere 3 with the probability that they will react with the $U_{235}$ component of the natural uranium to generate high energy neutrons of 2 Me V and above. Any thermal neutrons which fail to react and escape capture will be absorbed by the inner centered boron carbide shell 4 and hence the neutron spectrum that may be expected within the enclosure 5, is a fast neutron spectrum.

We claim:

1. Apparatus for irradiation in a neutron flux having a wide thermal energy spectrum and adapted in consequence of such irradiation to provide a well defined neutron spectrum having a dominant above-thermal spectrum component, the apparatus comprising means defining an enclosure for the reception of fast neutron-responsive devices, said enclosure being surrounded by a wall of neutron reactive material which undergoes reactions with thermal neutrons to produce fast neutrons and by a layer of thermal neutron absorber material between the enclosure and the neutron-reactive material.

2. Apparatus as claimed in claim 1 comprising a member of neutron moderating material having a cavity therein, means for supporting within the cavity a hollow sphere of natural uranium, a spherical shell of thermal neutron absorber material within the hollow sphere, coincident access ports in the sphere and the shell, an elongated member adapted to close said ports with plugs of appropriate material and serving also to support within the enclosure fast neutron-responsive devices.

3. Apparatus as claimed in claim 2 in which the hollow sphere of natural uranium is supported concentrically within a spherical cavity in a block of neutron moderating material which surrounds the hollow sphere.

4. Apparatus as claimed in claim 2, in which the hollow sphere is supported from below by a vertical cylinder, each end of which engages annular grooves formed respectively in the inner surface of the spherical cavity and in the outer surface of the natural uranium sphere; the length of the cylinder being such that the centre of the sphere substantially coincides with that of the cavity.

5. Apparatus as claimed in claim 3 having combined in the elongated member composite plugs of natural uranium and of boron carbide, effecting closure of access ports in the sphere and the shell respectively.

6. Apparatus as claimed in claim 5 in which the elongated member also incorporates a plug of moderating material which closes an access port in the member of moderating material.

7. Apparatus as claimed in claim 1 comprising a member of neutron moderating material having a hollow cavity therein of spherical form, a hollow sphere of natural uranium supported substantially concentric with the hollow cavity, a spherical shell of thermal neutron absorber within the hollow sphere defining an enclosure for the reception of experiments, coincident access ports in the member, the hollow sphere and the shell, a composite closure device extending from outside said member through the access ports and into the enclosure and providing plugs in said access ports, the neutronic properties of each plug matching those of the member whose access port it closes.

8. Apparatus for producing from a thermal neutron flux a flux having a fast neutron spectrum for use as a standard spectrum, the apparatus comprising concentric, inner and outer hollow spherical shells of respectively thermal neutron absorber material and natural uranium, coincident apertures in the shells, a closure member for the coincident apertures, said closure member comprising a composite plug including, end to end, a first inner portion of thermal neutron absorber material and a second contiguous outer portion of natural uranium, said portions being of a length equal to the thickness of the respective inner and outer shells, and support means extending from the inner portion of the composite plug for supporting a neutron responsive device from the first, inner, portion of the composite plug.

9. Apparatus as claimed in claim 8 including an outer block of moderator material, said outer block having a spherical cavity, and means for supporting the shells within the cavity concentrically with the outer wall of the shell of natural uranium spaced from the inner face of the spherical cavity.

* * * * *